United States Patent [19]

Chau

[11] Patent Number: 4,809,304
[45] Date of Patent: Feb. 28, 1989

[54] METHOD OF EXTRACTING A SYNCHRONOUS CLOCK SIGNAL FROM A SINGLE- OR DOUBLE-DENSITY CODED SIGNAL, AND APPARATUS FOR PERFORMING THE METHOD

[75] Inventor: N. Vo Chau, Villejust, France

[73] Assignee: Bull, S. A., Paris, France

[21] Appl. No.: 840,004

[22] Filed: Mar. 17, 1986

[30] Foreign Application Priority Data

Mar. 18, 1985 [FR] France ................................ 8503924

[51] Int. Cl.[4] ............................................. H04L 7/02
[52] U.S. Cl. ........................................ 375/110; 360/43
[58] Field of Search ................... 375/80, 82, 106, 110; 360/41, 42, 43, 45, 51; 307/269

[56] References Cited

U.S. PATENT DOCUMENTS

| 3,671,873 | 6/1972 | Haas et al. | 328/63 |
| 3,795,903 | 3/1974 | Lindsey | 360/42 |
| 4,245,264 | 1/1981 | Allen | 360/45 |
| 4,281,356 | 7/1981 | Sousa | 360/45 |
| 4,307,381 | 12/1981 | Isailovic | 340/347 DD |
| 4,462,051 | 7/1984 | Chan | 360/43 |
| 4,521,816 | 6/1985 | Kougami et al. | 360/45 |

FOREIGN PATENT DOCUMENTS

| 3202945 | 8/1983 | Denmark . |
| 2410920 | 6/1979 | France . |
| 2420253 | 10/1979 | France . |
| 56-132043 | 1/1982 | Japan . |
| 58-220534 | 4/1984 | Japan . |
| 59-60718 | 7/1984 | Japan . |
| 2075804 | 11/1981 | United Kingdom . |

Primary Examiner—Robert L. Griffin
Assistant Examiner—Stephen Chin
Attorney, Agent, or Firm—Kerkam, Stowell, Kondracki & Clarke

[57] ABSTRACT

The invention relates to a method for extracting a synchronous clock signal from a single- or double-density coded signal via a modulation frequency corresponding to the time interval T separating the most closely-spaced pulses of the received signal. This clock signal comprises a window that makes it possible to extract a binary data signal from the coded signal that is received; the values of the binary data signal have determinate durations T or 2T. The invention also relates to an apparatus for performing the method.

3 Claims, 2 Drawing Sheets

METHOD OF EXTRACTING A SYNCHRONOUS CLOCK SIGNAL FROM A SINGLE- OR DOUBLE-DENSITY CODED SIGNAL, AND APPARATUS FOR PERFORMING THE METHOD

FIELD OF THE INVENTION

The present invention relates to a method for extracting a synchronous clock signal from a single- or double-density coded signal, and to the apparatus making it possible to perform the method. This method and apparatus may be utilized either for transmitting signals or in processing signals emitted by a disk reader; these signals are coded in either single density (that is, by frequency modulation or FM) or double density (that is, by modified frequency modulation or MFM), with the same modulation frequency F. This frequency is the inverse of the time interval T (see FIG. 3) between the most closely-spaced pulses of the signal that is received.

BACKGROUND OF THE INVENTION

When a signal coded in FM or MFM is received, then if the signal representing the binary data is to be extracted from it, a synchronous clock signal will have to be generated from this coded signal, thereby making it possible to create a window that assures that information representing one datum can be distinguished from other information in the coded signal. This clock signal is improperly called a data separator, and data separator circuits which enable the generation of this clock signal are also known. Nevertheless, in the state of the art these circuits require an oscillator of one certain frequency to function in the FM mode, and an oscillator of another, higher, frequency to function in the MFM mode. Thus the circuits in the state of the art use the datum itself to charge the counter that enables assuring the recovery of the clock signal. These devices have the disadvantage, in the event of variations in the magnitude of the signal, of causing variations in the period of the clock signal corresponding to the data that has undergone some variation. These variations may be on the order of plus or minus 20% and are equivalent to variations of plus or minus 5% in the instantaneous rotational speed for the overall system.

OBJECT AND SUMMARY OF THE INVENTION

It is accordingly the object of the present invention to propose a method for extracting the clock signal that can function equally well in either the FM or MFM mode, without modification of the oscillator frequency, and which is insensitive to variations in the magnitude of the data.

The first object is attained by providing a method for extracting a synchronous clock signal from an FM signal coded in single density (that is, with frequency modulation) or from an MFM signal coded in double density (that is, with modified frequency modulation), where the modulation frequency corresponds to the time interval T separating the most closely-spaced pulses in the signal that is received, and where this synchronous clock signal comprises a window that enables extracting a data signal from the modulated signal that is received; the method includes the following steps:

- detection of the leading edges of the coded signal;
- charging a binary counter with at least one value following the detection of the leading edge;
- counting the pulses transmitted by an oscillator having a frequency the ratio of which to the modulation frequency of the coded signal is equal to the capacity N of the counter.

According to the invention, this method is characterized in that the charging is effected to a given value (X) when the data pulses are spaced apart by an integral multiple of time intervals T, while the charging is effected with the given value (X) increased by a value corresponding to half the capacity of the counter when the data pulses are spaced apart by a fractional number of time intervals T, and in that the sampling of the clock signal is effected via the highest-weighted bit of the counter.

Another object of the invention is to propose an apparatus that enables performing the method.

This object is attained by providing an apparatus characterized in that it includes an oscillator, which delivers a clock signal to a counter having a capacity "proportional to" the ratio of the oscillator frequency over the modulation frequency of the coded signal, with this counter being charged beforehand to a determinate value, and a circuit for detecting leading edges of the coded signal; the output of this circuit is connected to the input for validating the charging of the counter, and the output having the highest weight in the counter furnishing the synchronous clock signal, in the case of a coded signal being fed back to the charging input, corresponds to this point.

Further characteristics and advantages of the present invention will become more apparent from reading the ensuing description, taken in conjunction with the drawings.

DESCRIPTION OF THE PREFERRED EMBODIMENTS

Figure 1:
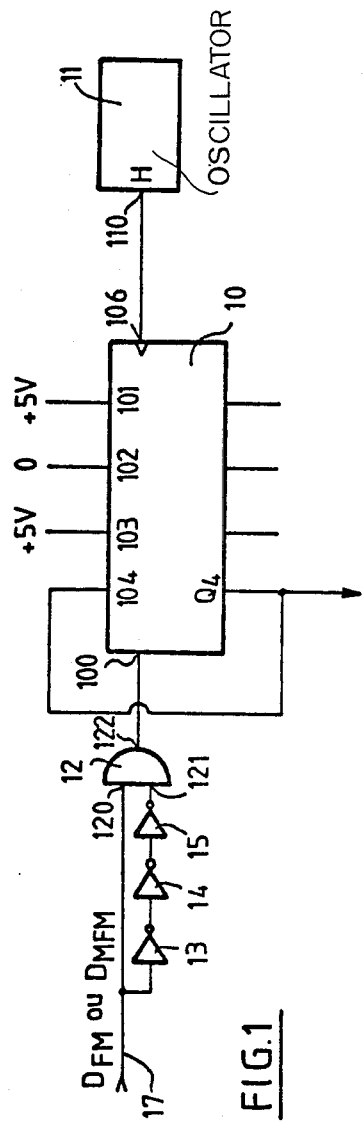
FIG. 1 shows an exemplary embodiment of the invention.

FIG. 1 shows a mode of embodiment of the invention in which the link 17 receives a signal coded in single density DFM or a signal coded in double density DMFM; the coded signal originates for instance from the reading head of a floppy disk. This coded signal is sent first to the input 120 of a gate 12 and second to the input of an inverting circuit, which comprises three inverters 13, 14 and 15 connected in series. This inverting circuit is connected to a second input 121 of the AND gate 12. The output 122 of the AND gate 12 is connected to the charging control input 100 of a binary counter 10. At its clock input 106, this binary counter 10 receives the output 110 of an oscillator 11 that oscillates at a frequency $F_H$ such as $F_H = N.F$. The symbol N represents the capacity of the binary counter, which in this example is 16 in FIG. 1, while the symbol F represents the modulation frequency of the received signal. This frequency F, in the case of a signal MFM, corresponds to the time interval T separating the various bits of the uncoded binary signal DB (see FIG. 3). The charging input 101 having the lowest weight and the charging input 103 of the binary counter 10 are connected to a potential of +5 volts, representing a logic level "1". The charging input 102 is connected to a potential of 0 volts, and the charging input 104 having the highest weight receives the output Q4 of the counter; this output corresponds to the highest-weight bits. The charging inputs 101–104 are in ascending order. As will be seen hereinafter, this output delivers the signal $Q_{4FM}$ or $Q_{4MFM}$, which comprises the synchronous clock signal of the received coded signal.

Figure 2:
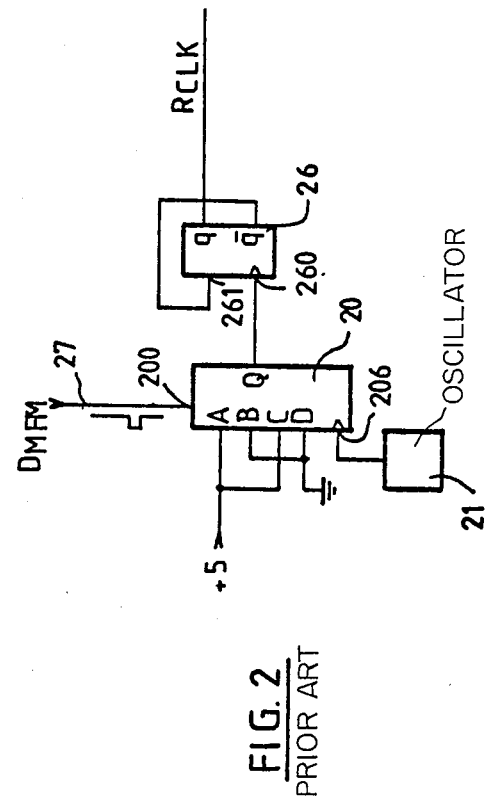
FIG. 2 shows a circuit that is representative of the prior art.

The circuit of FIG. 2 represents the prior art. In this circuit, the link 27 receives the coded signal and sends it to the charging input 200 of a binary counter 20. At 206, this binary counter receives the clock signal furnished by an oscillator 21 having the frequency $F_H$. The charging inputs A and C of the counter 20 are connected to a potential of +5 volts, representing a logic level "1", while the charging inputs B and D of this counter are connected to a potential of 0 volts, representing a logic level "0". The output Q of the counter 20 corresponds to the highest-weight bits and is sent to the clock input 260 of a D-type multivibrator 26, the output $\bar{q}$ of which is connected to the input 261. The output q of this multivibrator furnishes the signal RCLK.

Figure 3:
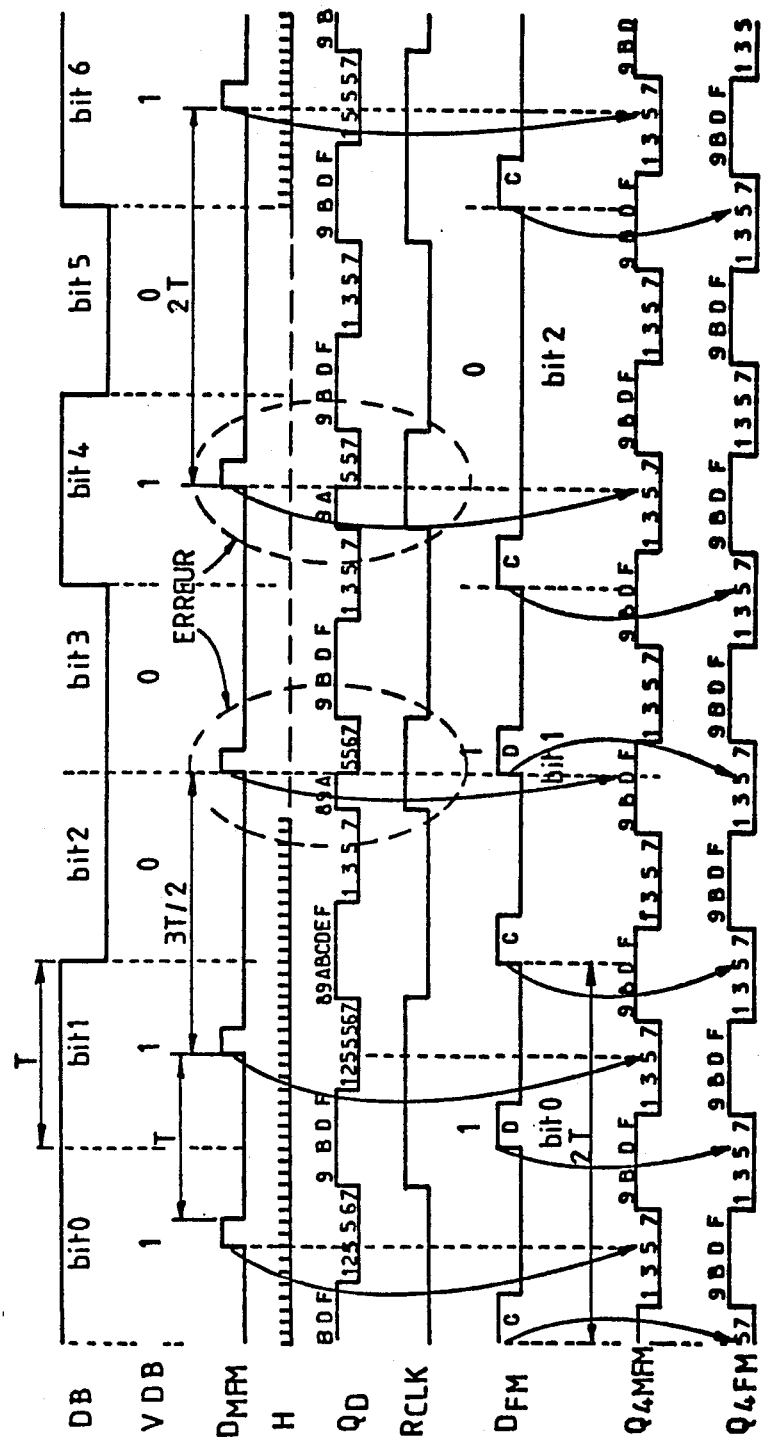
FIG. 3 shows timing diagrams of the various signals delivered either by the mode according to the invention or by the mode of the prior art.

The functioning of the prior art will now be explained, referring to FIG. 3, which shows the timing diagrams of the various signals. In FIG. 3, the first line shows a signal DB (uncoded binary data), representing the binary values that correspond to the double-density coded signal for the data received. The line VDB (binary data value) enables an indication that the value of the data corresponds to a logic level 1 in the cell associated with the bit 0, while the value of the binary data corresponds to a logic level "0" in the cell associated with the bit 2. The binary values of the signal DB change to time intervals T, corresponding to the modulation frequency.

When a binary signal is coded by frequency modulation (FM) or by modified frequency modulation (MFM), the coded signals furnish either the clock signal or the data pulse. The FM code is often called a single-density coded signal, and the MFM code is often called a double-density coded signal. In the FM code, represented on the indicated line by the symbol $D_{FM}$, each time interval 2T attributed to a bit and corresponding to one cell starts up with a pulse called a "clock pulse" (indicated by the symbol c), followed by the data pulse indicated by the symbol d on the line $D_{FM}$; this datum d is the value "0" or "1" and is located approximately in the middle of the cell. For an MFM coded signal (double density, represented on the indicated line by the symbol $D_{MFM}$ in FIG. 3), the pulse known as the clock pulse does not appear unless the data bit is at zero, and on the condition that a zero already precedes that one. In FIG. 3, T is the time interval associated with the modulation frequency F. The reference line H in FIG. 3 represents the clock signal, the frequency of which corresponds to 16 times the modulation frequency transmitted by MFM or FM. In fact, in FM the time interval associated with the bit 0 corresponds to a time period 2T. This value 16 corresponds to the capacity of the counter 10 of FIG. 1.

The line QD represents the signal delivered via the output Q of the counter of FIG. 2 (which shows the prior art). The function of this prior art is as follows. When the counter 20 receives a signal $D_{MFM}$ at its charging input 200, such as the signal shown on the corresponding line of FIG. 3, then the appearance of the pulse of the bit 0 will result in charging this counter to 5 and maintaining it at 5 during the entire duration of the pulse, until the moment when the pulse stops and the counter 20 begins to count the clock pulses 21, which it does until the data pulse corresponding to the bit 1 appears. At that moment, the counter is charged to 5, and when the pulse ends it resumes counting, until the moment when the clock pulse separating the bit 2 from the bit 3 appears. At that moment, as will be understood from the timing diagram in line QD, the counter passes from the hexadecimal value B to the value 5 and maintains this value 5 until the end of the pulse. It will be appreciated that this pulse has brought about a modification of the period of the signal QD, and that the circuits for processing the coded data signal and the signal QD will interpret this modification as an error. The processing circuit for processing coded data signals and the signal QD is well known in the art and is not shown here. The counter pursues its course and once again, when the data pulse associated with the bit 4 appears, its output QD starts to move from the hexadecimal value B to the value 5 and then again resumes normal counting once the pulse ends. This data pulse corresponding to the bit 4 again brings about a modification in the period of the signal QD. This modification will again be interpreted as an error by the processing circuits of the coded data signal and of the signal QD, which enables a clock signal RCLK to be generated. This clock signal RCLK comprises windows with respect to which the data pulses of the coded signal must remain in the same phase relation, which is not the case for the bits 2, 3 and 4 of the double-density coded signal.

The line $Q_{4MFM}$ of FIG. 3 represents the evolution of the signal furnished by the output Q4 of the counter 10 in FIG. 1, in the case where this counter receives a double-density coded signal ($D_{MFM}$). In the case of FIG. 1, the circuit 12, 13, 14, 15 assures the detection of the leading edges of data pulses or of clock pulses separating the data, and these leading edges enable the charging to a given value 5 selected arbitrarily as a function of the desired centering of data with respect to the window constituted by the signal furnished by the output Q4 of the counter 10. From the time a pulse appears that corresponds to a leading edge such as that associated with the data of bit 0, the counter will be charged to its given value X (in this example, 5) and will begin counting the clock pulses, until the moment when another pulse appears that is associated with the leading edge of a data bit 1. In this case, the charging value of the counter will depend on the preceding value of the output Q4. If the output Q4 was at zero, the counter will charge to 5, while if the value Q4 was at "1" at the clock pulse preceding the appearance of the leading edge of the coded signal $D_{MFM}$, the counter will charge to the hexadecimal value D. It was initially assumed for the bit 0 that the output Q4 of the counter 10 was at the level of zero, which corresponds to $Q_{4MFM}$. In the case where the starting value is 1, the output $Q_{4MFM}$ evolves inversely as compared with what is shown in FIG. 3. When the clock pulse separating the bits 2 and 3 intervenes in the coded data signal, this clock pulse being spaced apart from the data pulse associated with the bit 1 by a time interval equal to 3/2 T, the charging of the counter begins to take place at the opposite hexadecimal from that at which the charging was done for the bit 1, but that will not interfere with the period of the signal $Q_{4MFM}$. Consequently, the disadvantage of the prior art does not arise here. On the other hand, since the charging of the counter is brought about by the leading edge of the data pulse d or the "clock pulse" c, this synchronization makes it possible to eliminate the not-insignificant effects of the variation in magnitude of the data, a variation originating in the reading. This variation is on the order of plus or minus 20% and in the case of a floppy disk application is the equivalent of an error in the rotational speed of the disk of plus or minus 5%. This accordingly represents a second advantage of the invention. On the line $Q_{4FM}$, the signal at the output Q4 of the counter of FIG. 1 has been shown for the case where the counter receives a single density coded signal $D_{FM}$, and in the case where the output Q4 was at the zero level at the outset. If the output Q4 was at the level 1 at the outset, then an inverted signal $Q_{4FM}$ is obtained. The output Q4 then furnishes a clock signal that, in all cases, is synchronous with the coded signal $D_{FM}$, $D_{MFM}$.

Further modifications within the competence of one skilled in the art are also within the spirit and scope of the present invention.

What is claimed is:

1. A method for extracting a synchronous clock signal from a signal coded in single or double density for a modulation frequency corresponding to the time interval T separating the most closely-spaced pulses in the signal that is received, this synchronous clock signal comprising a window that enables the extraction of a binary data signal, the values of which have determinate durations T or 2T, from the modulated signal that is received, the method including the following steps:

detection of the leading edges of the coded signal;

charging a binary counter with at least one given value following the detection of the leading edge;

counting the pulses transmitted by an oscillator having a frequency the ratio of which to the modulation frequency of the coded signal is equal to the capacity N of the counter, wherein the method is characterized in that the step of charging is effected to a given value (X) when the data pulses are spaced apart by an integral multiple of time intervals T, while the charging is effected with the given value (X) increased by a value corresponding to half the capacity of the counter when the data pulses are spaced apart by a fractional number of time intervals T, and in that the sampling of the clock signal is effected via the highest-weighted bit of the counter.

2. The method according to claim 1, wherein said method including a method step of for delivering a clock signal to a counter (10), the capacity N of said clock signal being proportional to the ratio of the oscillator frequency $f_H$ over the modulation frequency of the coded signal, said counter being charged beforehand to a determinated value by a charging control input of the counter, said method further including a step for detecting leading edges of the coded signal and for validating the charging of the counter, having the highest weight in the counter furnishing the synchronous clock signal in the case of a coded signal being fed back to the charging input corresponding to this weight.

3. An apparatus for extracting a synchronous clock signal from a signal coded in single or double density, comprising an oscillator for delivering a clock signal to a counter the capacity N of said clock signal being proportional to the ratio of the oscillator frequency $F_H$ over the modulation frequency of the coded signal, said counter being charged beforehand to a determined value by a charging control input of the counter, circuit means for detecting leading edges of the coded signal, said circuit means having an output connected to the charging control input of the counter for validating the charging of the counter, the output having the highest weight in the counter furnishing the synchronous clock signal in the case of a coded signal being fed back to the charging input corresponding to this weight.

* * * * *